United States Patent [19]

Hsu

[11] Patent Number: 5,601,072

[45] Date of Patent: Feb. 11, 1997

[54] ATOMIZING DEVICE FOR OILY SMOKE

[76] Inventor: Teng-Hsien Hsu, No. 105, Lin-Hsi Street, Lin-Ya District, Kaohsiung, Taiwan

[21] Appl. No.: 661,997

[22] Filed: Jun. 12, 1996

[51] Int. Cl.[6] .................................................. F24C 15/20
[52] U.S. Cl. ................................ 126/299 E; 126/299 D; 55/440; 55/441; 55/464; 55/DIG. 36
[58] Field of Search .......................... 126/299 R, 299 D, 126/299 E, 301; 55/DIG. 36, 440, 441, 446

[56] References Cited

U.S. PATENT DOCUMENTS

| 3,093,469 | 6/1963 | Woolston et al. | 55/441 |
|---|---|---|---|
| 3,393,497 | 7/1968 | Donnelly | 55/DIG. 36 |
| 3,950,156 | 4/1976 | Kall | 55/440 |
| 4,363,642 | 12/1982 | Stahl | 126/299 E |
| 4,364,754 | 12/1982 | Diachuk | 126/299 E |
| 5,359,990 | 11/1994 | Hsu | 126/299 E |

*Primary Examiner*—James C. Yeung
*Attorney, Agent, or Firm*—Larson and Taylor

[57] ABSTRACT

An oily smoke atomizing device includes a housing, a passage defined in the housing and having a first end in fluid communication with an inlet of the housing and a second end in fluid communication with an outlet of the housing, and a plurality of atomizing plates mounted in the passage. Each atomizing plate includes a plurality of first tubes and a plurality of second tubes to define an oily smoke passage. Oil contained in the oily smoke is separated into oil particulates when passing through the atomizing plates. A water tube is disposed above the atomizing plates and includes a plurality of nozzles for supplying water drops to the first tubes and second tubes of the atomizing plates for absorbing the oil particulates in the oily smoke passing through the oily smoke passage and carrying the oil particulates downwardly to a drainage hole. A crooked second passage is defined between the first-mentioned passage and the outlet to make the smoke leaving the oily smoke passage and containing fewer oil particulates collide with an inner wall defining the second passage such that the oil becomes liquefied oil which is then drained.

7 Claims, 6 Drawing Sheets

5,601,072

ATOMIZING DEVICE FOR OILY SMOKE

BACKGROUND OF THE INVENTION

1. Field of the Invention

The present invention relates to a treating device for oily smoke and, more particularly, to a treating device which atomizes oily smoke passing therethrough for treatment.

2. Description of the Related Art

U.S. Pat. No. 5,359,990 issued to Applicant on Nov. 1, 1994 discloses an oily smoke treating and exhausting device for cooking equipment, the device comprising an upper smoke housing, two vertical passageways defined by three vertical plates extending down and up from the housing for oily smoke produced during cooking to be showered with water to let oil in the smoke be mixed with water and drop down into a separating tank so that oil may float on top of water in the tank and overflow into a waste oil tank to be exhausted. In brief, the oily smoke treating and exhausting device includes a complicated arrangement as it must liquefy the oil first and then separate the liquefied oil.

The present invention is intended to provide an improved, simple design in this regard.

SUMMARY OF THE INVENTION

It is an object of the present invention to provide a treating device which includes a plurality of atomizing plates for atomizing oil in the oily smoke passing therethrough, thereby providing an improved effect with a simple structure.

An oily smoke atomizing device in accordance with the present invention generally comprises a housing including an inlet and an outlet for oily smoke to pass therethrough and a drainage hole, a passage defined in the housing and having a first end in fluid communication with the inlet and a second end in fluid communication with the outlet, and a plurality of atomizing plates mounted in the passage.

Each atomizing plate comprises a plurality of first tubes and a plurality of second tubes, each first tube having a first hole defined therein and a plurality of first blades projecting from an inner periphery thereof and extending counterclockwise, and each second tube having a second hole defined therein and a plurality of second blades projecting from an inner periphery thereof and extending clockwise. The first tubes and the second tubes are arranged so that one first tube on an upper atomizing plate aligns with a corresponding second tube on a lower atomizing plate and so that one second tube on an upper atomizing plate aligns with a corresponding first tube on a lower atomizing plate, thereby defining an oily smoke passage. The oily smoke, when passing through the first tubes, becomes a turbulent column which rotates counterclockwise, and, when passing through the second tubes, becomes a turbulent column which rotates clockwise, such that oil contained in the oily smoke is separated into oil particulates.

A water tube is disposed above the atomizing plates and includes a plurality of nozzles for supplying water drops to the first tubes and second tubes of the atomizing plates for absorbing the oil particulates in the oily smoke passing through the oily smoke passage and carrying the oil particulates downwardly to the drainage hole, thereby removing the oil from the oily smoke. A fan is mounted in the housing for indrafting the oily smoke from the inlet through the oily smoke passage to the outlet.

In a preferred embodiment of the invention, each first tube further includes a third tube therein. The third tube has an outer periphery connected to distal ends of the first blades and defines a third hole therein and a plurality of third blades project from an inner periphery thereof and extending counterclockwise.

Preferably, a detergent container is disposed in the housing, and a connecting tube interconnecting the detergent container and the water tube as well as a valve means are provided for controlling output of detergent in the detergent container to the water tube for cleaning the atomizing plates.

Preferably, the atomizing plates are secured by bolts and nuts, thereby allowing assembly and disassembly of the atomizing plates.

In the preferred embodiment of the invention, a crooked second passage is defined between the first-mentioned passage and the outlet to make the oily smoke leaving the oily smoke passage and containing fewer oil particulates to collide with an inner wall defining the second passage such that the oil particulates become liquefied and the liquid is then drained to a lower end of the second passage which, in turn, is connected to the drainage hole by a conduit for drainage.

Other objects, advantages, and novel features of the invention will become more apparent from the following detailed description when taken in conjunction with the accompanying drawings.

DESCRIPTION OF THE PREFERRED EMBODIMENT

Figure 1:
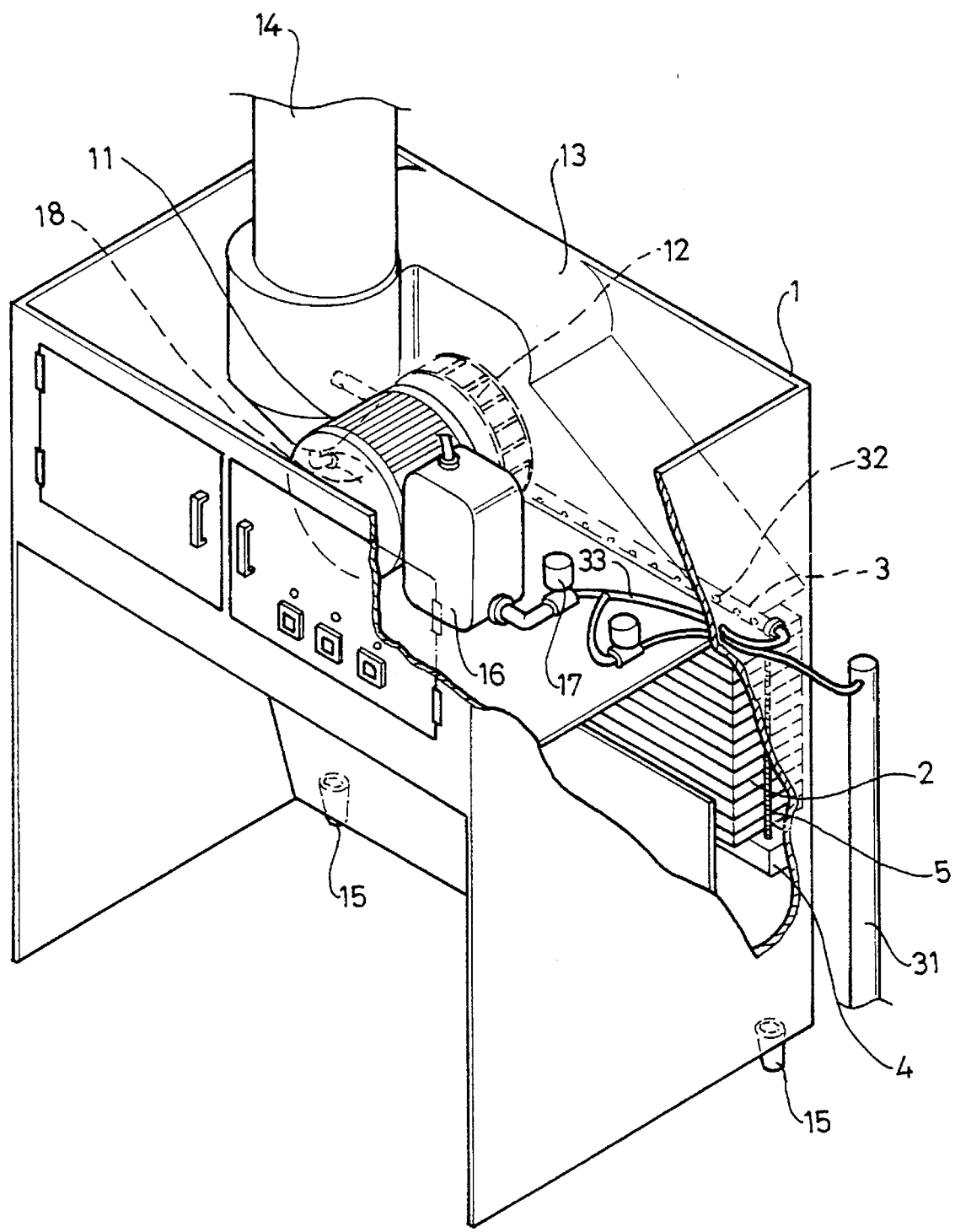
FIG. 1 is a perspective view, partially cutaway, of an oily smoke atomizing device in accordance with the present invention.
Figure 2:
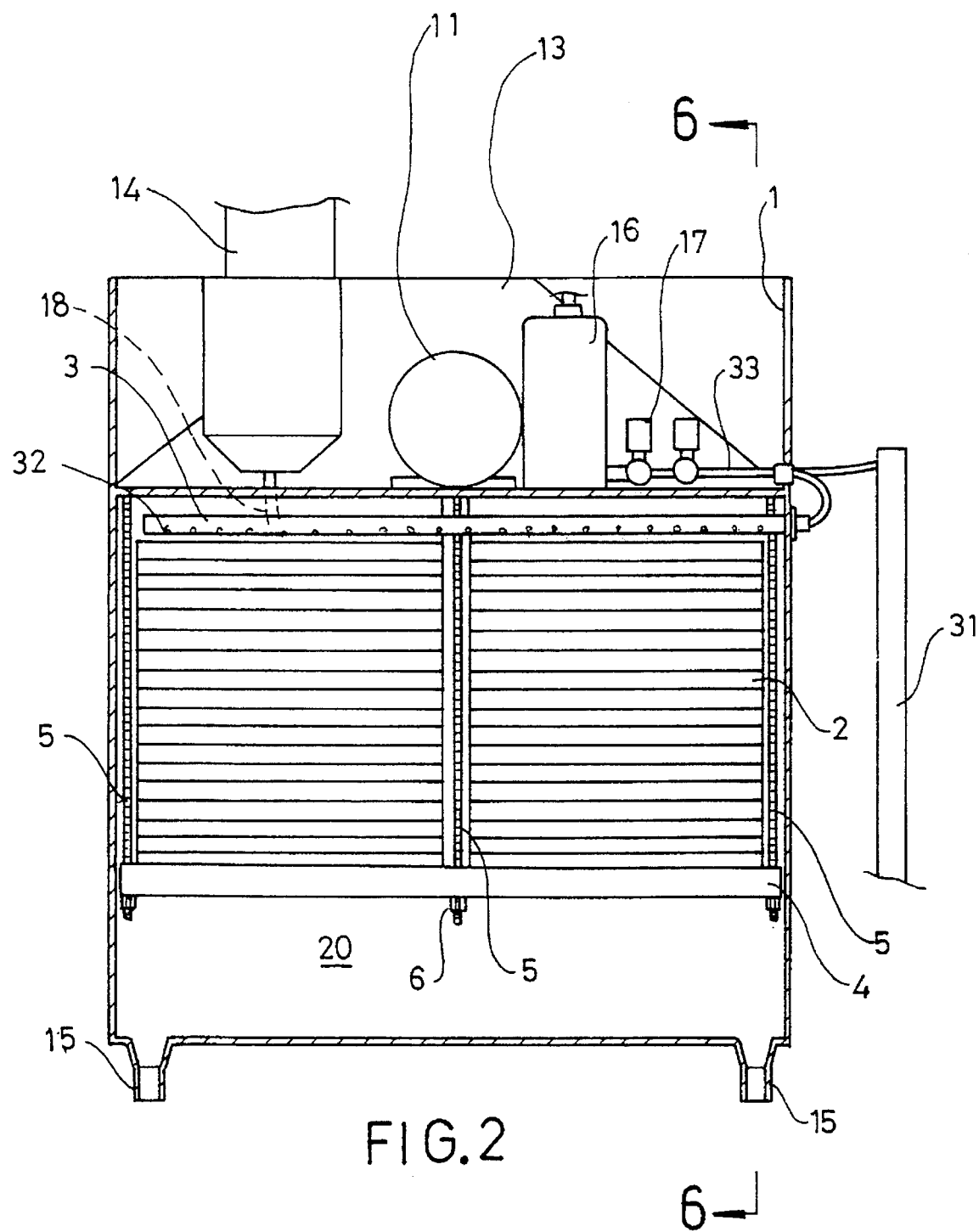
FIG. 2 is a cross-sectional view, taken along line 2—2 in FIG. 6, of the oily smoke atomizing device in accordance with the present invention.
Figure 6:
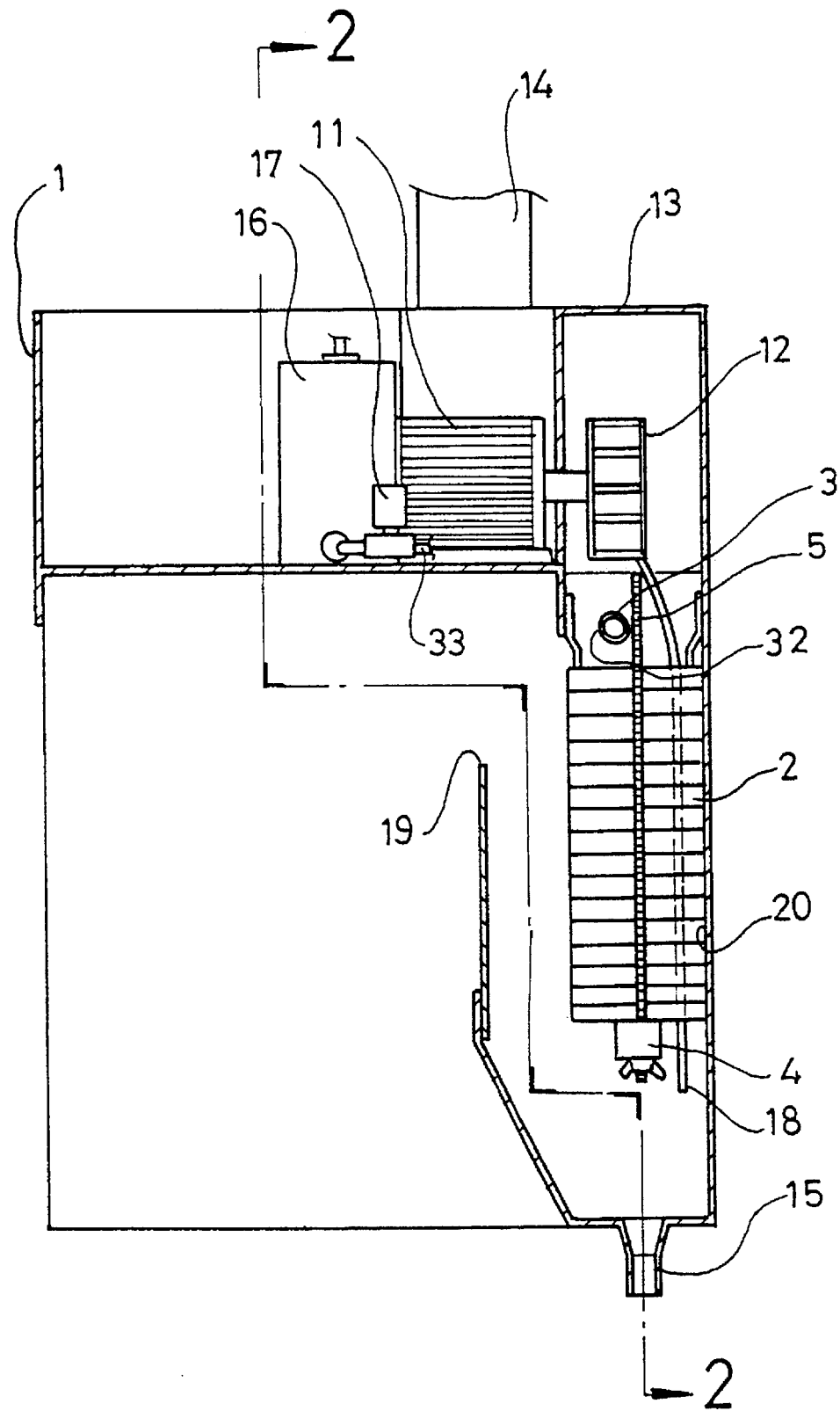
FIG. 6 is a cross-sectional view taken along line 6—6 in FIG. 2.

Referring to the drawings and initially to FIGS. 1, 2 and 6, an oily smoke atomizing device in accordance with the present invention generally comprises a housing 1 including an inlet 19 and an outlet 14 for oily smoke to pass therethrough and a drainage hole 15, a passage 20 defined in the housing 1 and having a first end in fluid communication with the inlet 19 and a second end in fluid communication with the outlet 14, and a plurality of atomizing plates 2 mounted in the passage 20 and supported by a support member 4.

Figure 3:
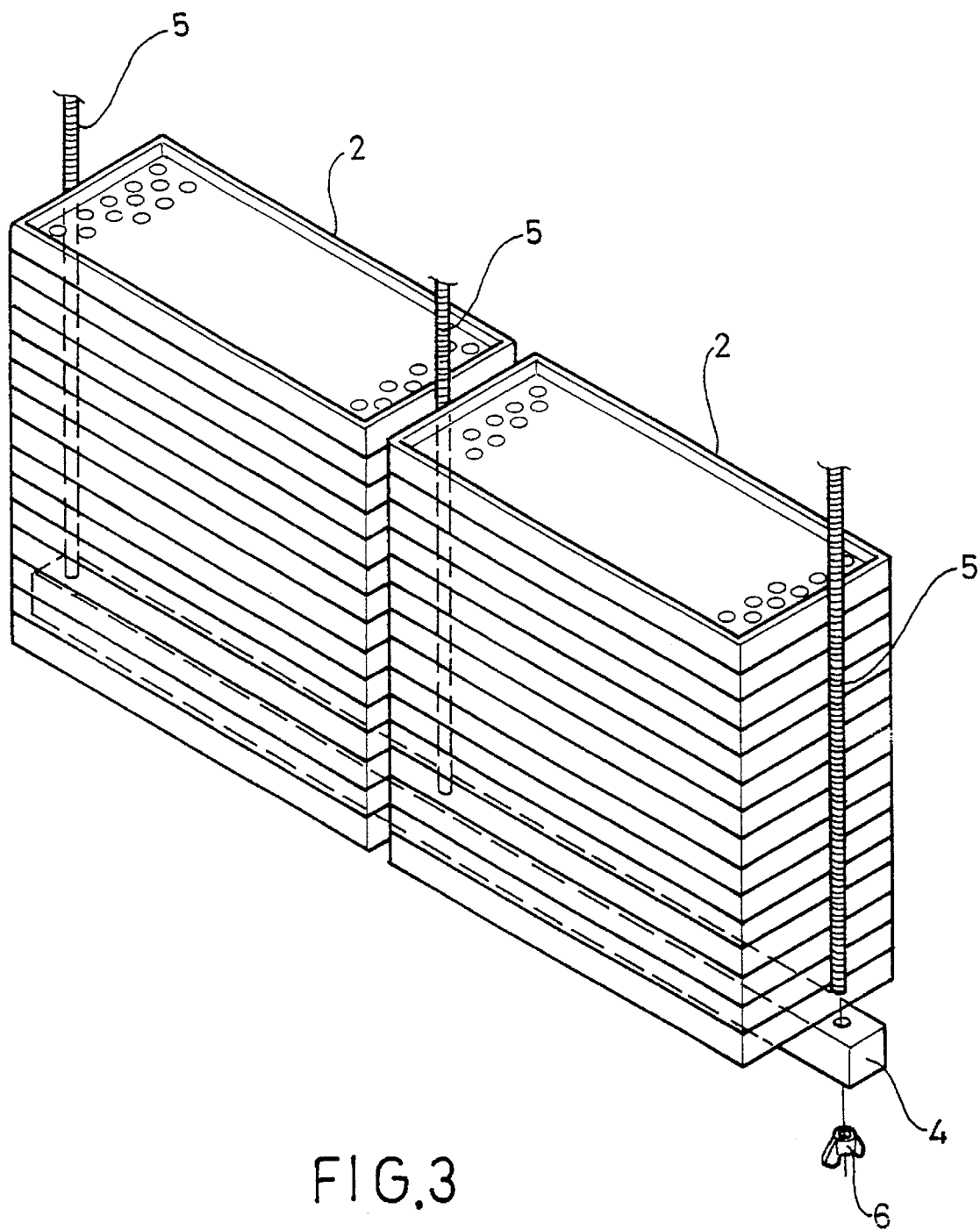
FIG. 3 is a perspective view illustrating atomizing plates of the oily smoke atomizing device.
Figure 5:
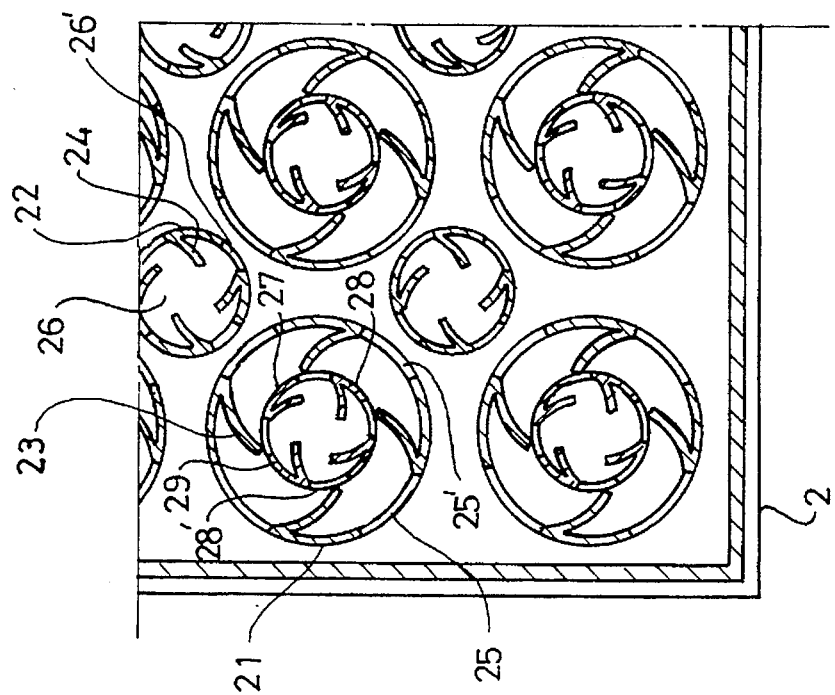
FIG. 5 is a cross-sectional view taken along line 5—5 in FIG. 4.
Figure 4:
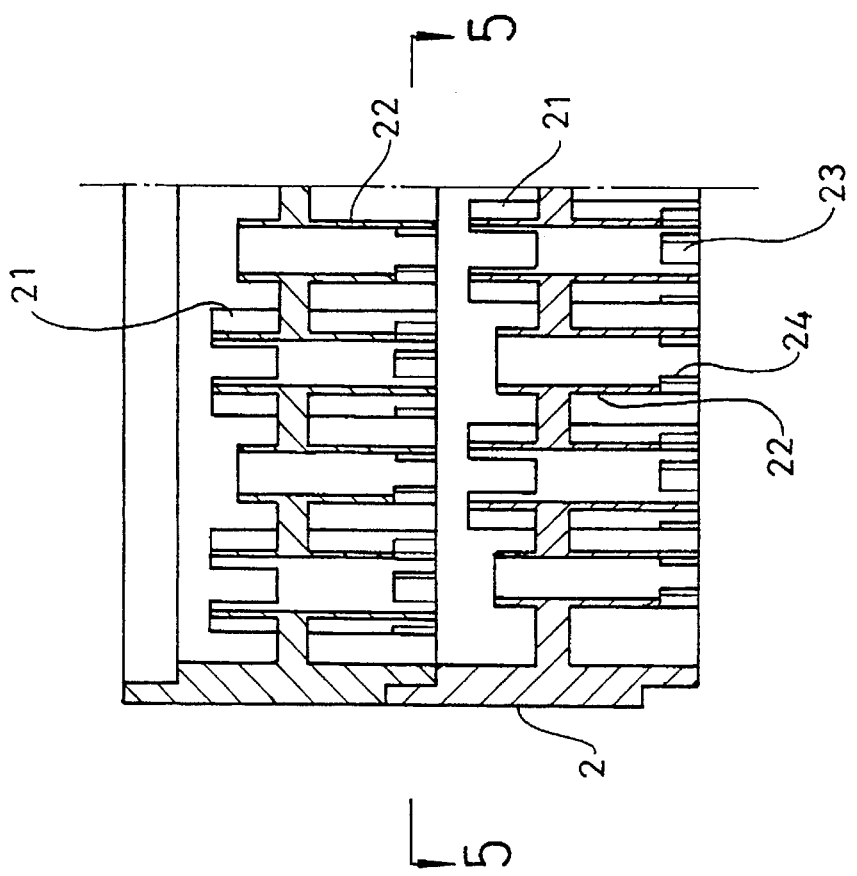
FIG. 4 is a partially cross-sectional view of the atomizing plates.

Referring to FIGS. 3 to 5, each atomizing plate comprises a plurality of first tubes 21 and a plurality of second tubes 22, each first tube 21 having a first hole 25 defined therein and a plurality of first blades 23 projecting from an inner periphery thereof and extending counterclockwise, and each second tube 22 having a second hole 26 defined therein and a plurality of second blades 24 projecting from an inner periphery thereof and extending clockwise. The first tubes 21 and the second tubes 22 are arranged so that one first tube 21 on an upper atomizing plate 2 aligns with a corresponding second tube 22 on a lower atomizing plate 2 and so that one second tube 22 on an upper atomizing plate 2 aligns with a corresponding first tube 21 on a lower atomizing plate 2, thereby defining an oily smoke passage. The oily smoke, when passing through the first tubes, becomes a turbulent column which rotates counterclockwise, and, when passing through the second tubes, becomes a turbulent column which rotates clockwise, such that oil contained in the oily smoke is atomized, i.e, the oil is separated into oil particulates. Preferably, the first hole 25 is larger than the second hole 26 in diameter. In a preferred embodiment of the invention, the first tube further includes a third tube 27 therein, the third tube 27 having an outer periphery connected to distal ends of the first blades 23 and defining a third hole 28 therein and a plurality of third blades 29 projecting from an inner periphery thereof and extending counterclockwise. The atomizing plates 2 are secured by bolts 5 and nuts 6, thereby allowing assembly and disassembly of the atomizing plates 2 for cleaning.

A water tube 3 is disposed above the atomizing plates 2 and includes a plurality of nozzles 32 (see FIG. 1) for supplying water drops to the first tubes 21 and second tubes 22 of the atomizing plates 2 for absorbing the oil particulates in the oily smoke passing through the oily smoke passage and carrying the oil particulates downwardly to the drainage hole 15. A fan 12 is mounted in the housing 1 for indrafting the oily smoke from the inlet 19 through the oily smoke passage to the outlet 14.

In a preferred embodiment of the invention, the first, second, and third tubes 21, 22, and 27 respectively include a plurality of openings 25', 26' and 28' defined in the peripheral walls thereof for preventing accumulation of water between the atomizing plates 2.

Referring to FIGS. 1, 2, and 6, for periodical cleaning of the atomizing plates 2, a detergent container 16 is disposed in the housing 1, and a connecting tube 33 interconnecting the detergent container 16 and the water tube 3 as well as a valve means 17 are provided for controlling output of detergent in the detergent container 16 to the water tube 3.

Still referring to FIGS. 1, 2, and 6, a second passage 13 is defined between the first-mentioned passage 20 and the outlet 14. The second passage 13 is crooked to make the smoke leaving the oily smoke passage and containing fewer oil particulates to collide with an inner wall defining the second passage 13 such that the oil particulates become liquefied. A conduit 18 interconnects a lower end of the second passage 13 to the drainage hole 15 for draining the liquefied oil.

Figure 7:
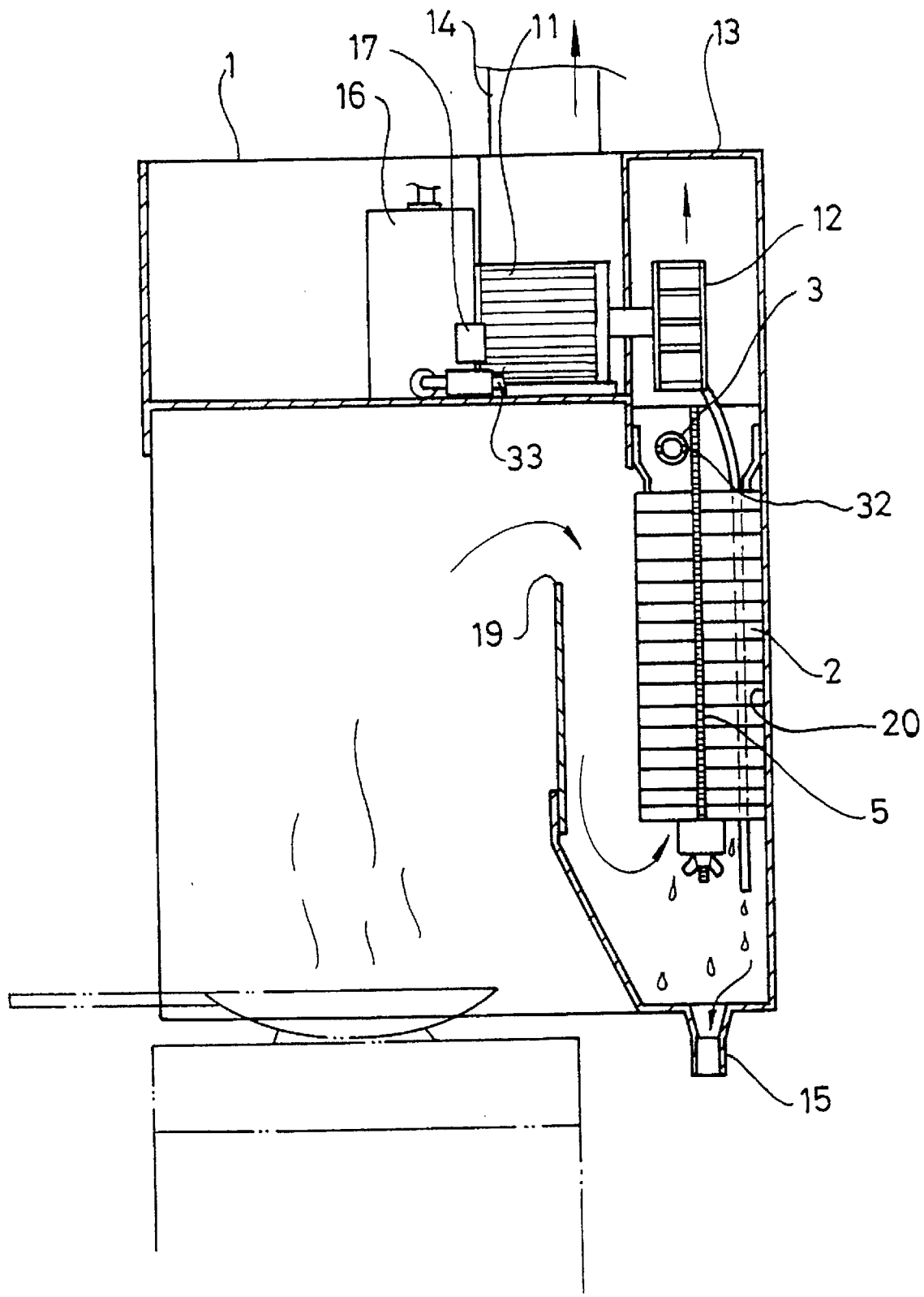
FIG. 7 is a schematic cross-sectional view illustrating operation of the oily smoke atomizing device in accordance with the present invention.

Referring to FIG. 7, under operation of the fan 12 driven by a motor 11 disposed in the housing 1, the oily smoke from a cooking pot (shown by phantom lines) passes through the oily smoke passage defined by the first and second tubes 21 and 22 of the atomizing plates 2 and thus forms a counterclockwise turbulent column and a clockwise turbulent column in the first tubes 21 and the second tubes 22, respectively, such that the oil contained in the oily smoke is separated into oil particulates. Water supplied from the water tube 3 impacts the turbulent column of oily smoke and thus solves the oil particulates in the oily smoke and carries the oil particulates downwardly to the drainage hole 15. The smoke leaving the oily smoke passage contains fewer oil particulates and collides with the inner wall of the crooked second passage 13 when passing through the later such that the oil particulates become liquefied oil which is then drained via the conduit 18 and the drainage hole 15. Only an extremely small amount of oil contained in the smoke exits the oily smoke atomizing device via the outlet 14.

Although the invention has been explained in relation to its preferred embodiment, it is to be understood that many other possible modifications and variations can be made without departing from the spirit and scope of the invention as hereinafter claimed.

What is claimed is:

1. An oily smoke atomizing device comprising:

a housing including an inlet and an outlet for oily smoke to pass therethrough and a drainage hole;

a passage defined in the housing and having a first end in fluid communication with the inlet and a second end in fluid communication with the outlet;

a plurality of atomizing plates mounted in the passage, each said atomizing plate comprising a plurality of first tubes and a plurality of second tubes, each said first tube having a first hole defined therein and a plurality of first blades projecting from an inner periphery thereof and extending counterclockwise, each said second tube having a second hole defined therein and a plurality of second blades projecting from an inner periphery thereof and extending clockwise, said first tubes and said second tubes being arranged so that one said first tube on an upper said atomizing plate aligns with a corresponding said second tube on a lower said atomizing plate and so that one said second tube on an upper said atomizing plate aligns with a corresponding said first tube on a lower said atomizing plate, thereby defining an oily smoke passage for separating oil contained in the oily smoke into oil particulates;

a water tube disposed above the atomizing plates and including a plurality of nozzles for supplying water drops to the first tubes of the atomizing plates for absorbing the oil particulates in the oily smoke passing through the oily smoke passage and carrying downwardly the oil particulates downwardly to the drainage hole; and a fan mounted in the housing for indrafting the oily smoke from the inlet through the oily smoke passage to the outlet.

2. The oily smoke atomizing device as claimed in claim 1, wherein the first tube further includes a third tube therein, the third tube having an outer periphery connected to distal ends of the first blades and defining a third hole therein and a plurality of third blades projecting from an inner periphery thereof and extending counterclockwise.

3. The oily smoke atomizing device as claimed in claim 1, further comprising a detergent container disposed in the housing, a connecting tube interconnecting the detergent container and the water tube, and a valve means for controlling output of detergent in the detergent container to the water tube.

4. The oily smoke atomizing device as claimed in claim 1, wherein the atomizing plates are secured by bolts and nuts, thereby allowing assembly and disassembly of the atomizing plates.

5. The oily smoke atomizing device as claimed in claim 1, further comprising a second passage defined between the first-mentioned passage and the outlet, the second passage being crooked to make the oil particulates contained in the oily smoke leaving the oily smoke passage collide with an inner wall defining the second passage such that the oil particulates become liquefied, the second passage including a lower end and a conduit interconnecting the lower end of the second passage to the drainage hole for draining the liquefied oil.

6. An atomizing plate assembly for an oily smoke treating device comprising a housing including an inlet and an outlet for oily smoke to pass therethrough and a drainage hole, a passage defined in the housing and having a first end in fluid communication with the inlet and a second end in fluid communication with the outlet, a water tube for supplying water drops to remove the oil particulates in the oily smoke passing through the oily smoke passage, and a fan mounted in the housing for indrafting the oily smoke from the inlet through the oily smoke passage to the outlet, the atomizing plate being mounted in the passage and comprising a plurality of atomizing plates each comprising:

a plurality of first tubes and a plurality of second tubes, each said first tube having a first hole defined therein and a plurality of first blades projecting from an inner periphery thereof and extending counterclockwise, each said second tube having a second hole defined therein and a plurality of second blades projecting from an inner periphery thereof and extending clockwise, said first tubes and said second tubes being arranged so that one said first tube on an upper said atomizing plate aligns with a corresponding said second tube on a lower said atomizing plate and so that one said second tube on an upper said atomizing plate aligns with a corresponding said first tube on a lower said atomizing plate, thereby defining an oily smoke passage for separating oil contained in the oily smoke into oil particulates.

7. The atomizing plate assembly as claimed in claim 6, wherein the first tube further includes a third tube therein, the third tube having an outer periphery connected to distal ends of the first blades and defining a third hole therein and a plurality of third blades projecting from an inner periphery thereof and extending counterclockwise.

* * * * *